July 3, 1956     D. H. SMITH     2,753,510
CURRENT SUPPLY APPARATUS
Filed April 30, 1953
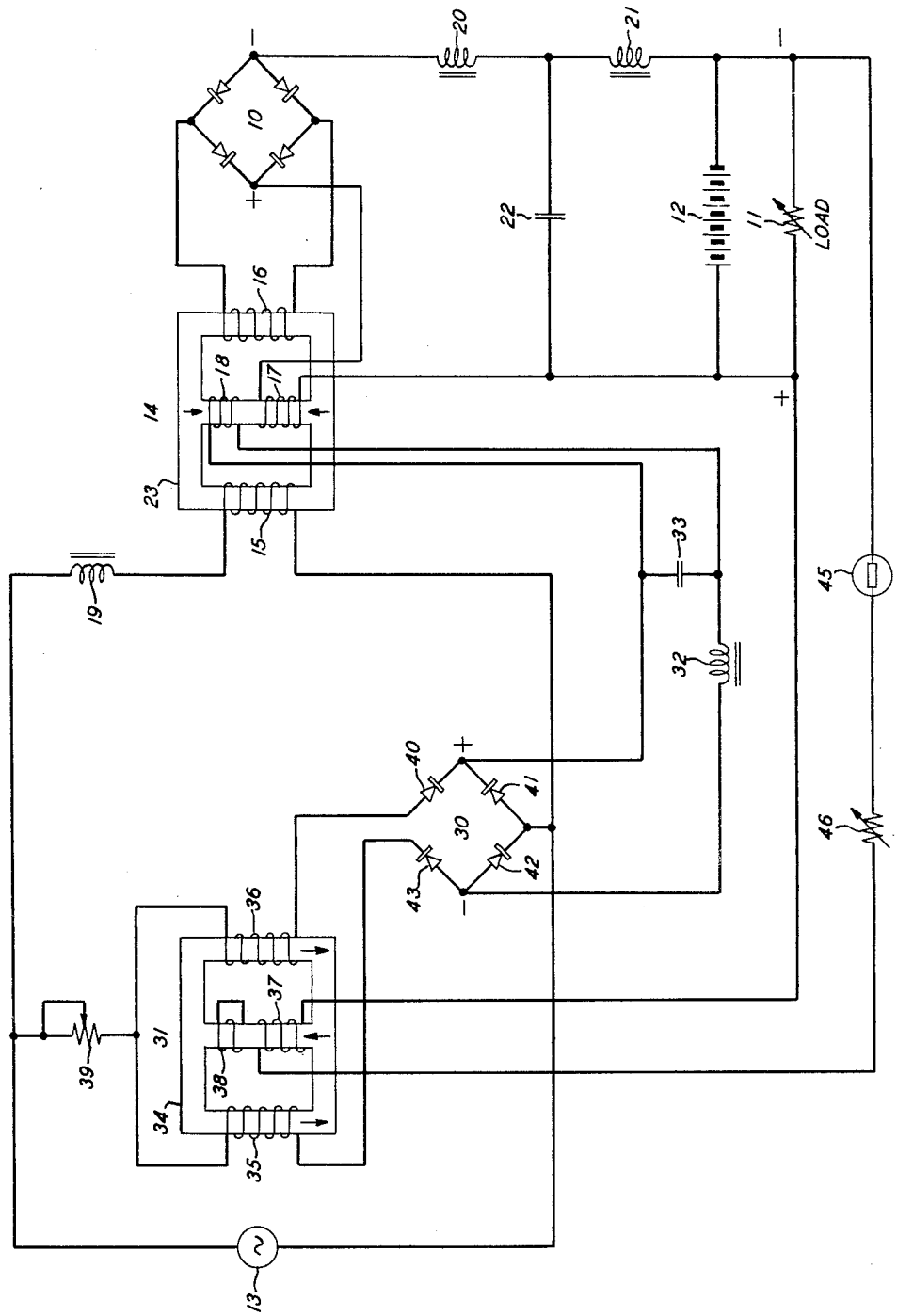
INVENTOR
D. H. SMITH
BY
G. F. Heuerman
ATTORNEY

United States Patent Office 2,753,510
Patented July 3, 1956

2,753,510

CURRENT SUPPLY APPARATUS

Donald H. Smith, Livingston, N. J., assignor to Bell Telephone Laboratories, Incorporated, New York, N. Y., a corporation of New York Application April 30, 1953, Serial No. 352,084

8 Claims. (Cl. 321—19)

This invention relates to current supply apparatus and particularly to regulated rectifying apparatus for controlling the supply of rectified current to a load.

An object of the invention is to provide improved apparatus for minimizing voltage changes across a load to which current is supplied from a source of rectified alternating current.

In accordance with a specific embodiment of the invention, herein shown and described for the purpose of illustration, there is provided for supplying direct current to a load circuit a rectifier to which alternating current is supplied through a saturable transformer having a secondary winding connected to the rectifier input terminals and a primary winding connected through an inductive reactor to an alternating-current supply source. The secondary voltage of the transformer is controlled in response to direct currents supplied to two saturating windings, respectively, of the transformer for controlling the direct flux in the magnetic circuit for the primary and secondary windings. Current is supplied from the rectifier through a first of the saturating windings to the load. There is supplied to the second saturating winding a direct current which increases both in response to an increase of line voltage and also in response to an increase of load voltage. The magnetomotive forces set up in the transformer core due to the currents supplied to the saturating windings, respectively, are opposed and the maximum magnetomotive force due to the first winding to which the load current is supplied is equal to or somewhat less than the minimum magnetomotive force due to the second saturating winding. Therefore, the secondary voltage of the saturable transformer is increased in response to an increase of load current supplied to the first saturating winding and the secondary transformer voltage is decreased with respect to the voltage of the supply source in response to an increase of current supplied to the second saturating winding.

The means for controlling the supply of current to the second saturating winding of the saturable transformer comprises a saturable reactor having a plurality of windings on a core of magnetic material and an auxiliary rectifier. Pulsating unidirectional currents are caused to flow from the alternating-current supply source through a first and a second winding of the saturable reactor alternately during successive half-cycle periods of the supply source and the sum of these pulsating currents is supplied, through a filter for suppressing alternating components, to the second saturating winding of the saturable transformer. Direct current is supplied to a third winding of the saturable reactor through a circuit connected across the load and comprising a temperature compensating thermistor and a variable resistor by means of which the load voltage may be adjusted to a desired value. The unidirectional magnetomotive force due to the current supplied to the third winding of the saturable reactor aids the magnetomotive forces due to the currents supplied to the first and second windings in the portions of the reactor core on which the first and second windings, respectively, are wound. Therefore, the unidirectional flux in the core of the saturable reactor is increased in response to a voltage increase of the line voltage source and also in response to an increase of load voltage to decrease the impedance of the first and second windings of the saturable reactor. The resulting increase of current supplied to the second saturating winding of the saturable transformer, therefore, is larger than it would be if alternating current from the supply source were supplied through the first and second windings of the saturable reactor to the input of an auxiliary rectifier and the output of the auxiliary rectifier were connected to supply direct current to the second saturating winding of the saturable transformer. The relationship between the voltage of the supply source and the control current supplied to the second saturating winding of the saturable transformer is thus improved to reduce the changes of load voltage with respect to a selected voltage in response to line voltage variations.

The invention will be described in greater detail with reference to the accompanying drawing the single figure of which is a schematic view of a regulated rectifier embodying the invention.

Referring to the drawing, there is provided a main bridge rectifier 10 for supplying direct current to a load circuit comprising a load 11 which may vary and a floating battery 12 across the load 11, when alternating current from a supply source 13 is supplied to the rectifier 10. Alternating current is supplied to the input terminals of rectifier 10, through a saturable transformer 14 comprising a three-legged core 23 of magnetic material, a primary winding 15 on one of the outer legs of the core, a secondary winding 16 on the other outer leg and two saturating windings 17 and 18 on the middle leg. Current from the supply source 13 is supplied through an inductive reactor 19 to the primary winding 15 and the input terminals of rectifier 10 are connected to the terminals of the secondary winding 16. The output current of rectifier 10 is supplied to the load 11, 12 through the saturating winding 17 of the transformer 14 and through a ripple filter comprising series choke coils 20 and 21 and a shunt condenser 22.

The energization of the saturating winding 18 of the saturable transformer 14 is controlled by means comprising an auxiliary rectifier 30 having rectifying elements 40, 41, 42 and 43 and a saturable reactor 31. The positive output terminal of rectifier 30 is connected directly to one terminal of saturating winding 18 and the negative terminal of the auxiliary rectifier 30 is connected to the other terminal of winding 18 through an inductive reactor 32 of a ripple filter which also includes a condenser 33 connected across the winding 18. The relatively steady unidirectional current thus supplied to winding 18 sets up in the transformer core a unidirectional magnetomotive force which is opposed to the unidirectional magnetomotive force set up in the core due to current supplied to winding 17, the relative directions of these magnetomotive forces being indicated by the arrows in the drawing.

The saturable reactor 31 comprises a three-legged core 34 of magnetic material, windings 35 and 36 on the outer legs, respectively, and windings 37 and 38 on the middle leg of the core. Unidirectional pulsating currents from source 13 are supplied through windings 35 and 36. During one-half cycle period of the alternating current of source 13, current flows through a series circuit comprising a variable resistor 39, winding 36, rectifying element 40, winding 18 and condenser 33 in parallel, inductive reactor 32 and rectifying element 42. During the next half-cycle period of the supply source 13, current flows through a series circuit comprising rectifying element 41, winding 18 and condenser 33 in parallel, inductive reactor 32, rectifying element 43, winding 35 and variable resistor 39. The sum of the unidirectional pulsating currents supplied to windings 35 and 36 are thus supplied to the winding 18 after suppression of the alternating components by the filter 32, 33. The positive load terminal is connected to one terminal of the winding 37 and the negative load terminal is connected through a temperature compensating thermistor 45 and a variable resistor 46 to the other terminal of winding 37. Alternatively, thermistor 45 and resistor 46 may be connected in series with inductor 32 and the winding 18, if desired. The winding 38 is short-circuited to provide a load for undesired harmonic voltages which may be generated if there is an unbalance between windings 35 and 36. The unidirectional magnetomotive force set up due to current supplied to winding 37 is in aiding relationship with respect to the unidirectional magnetomotive forces set up in the outer legs of the core, respectively, due to the currents supplied to windings 35 and 36, as indicated by the arrows in the drawing.

Under normal operating conditions of line voltage and current, the magnetomotive force due to the load current supplied to winding 17 is equal to or less than the minimum magnetomotive force due to current supplied to winding 18. Within the normal orperating range, therefore, as the load increases, for example, the saturation of the transformer core is reduced and the secondary voltage across transformer winding 16 increases by the amount required to maintain the load voltage substantially constant, it being assumed for the present that the line voltage of source 13 is also constant. A reduction of the unidirectional saturating flux in the core 23, for example, increases the impedance of winding 15 so that the alternating voltage across transformer winding 15 increases while the alternating voltage across reactor 19 is correspondingly reduced. Moreover, a reduction of the unidirectional flux causes the alternating flux in the core due to current in winding 15 to increase. For these reasons a reduction of the unidirectional flux in the core causes the voltage across secondary winding 16 to increase. If under an abnormal condition the load current should rise to a value such that the magnetomotive force due to winding 17 increases to a value greater than the magnetomotive force due to winding 18, the saturation of the core will be increased and the voltage across secondary winding 16 will decrease, thereby limiting the load current to a safe maximum value.

Assuming now that the load is constant, there is supplied to the saturating winding 18 of transformer 14 a current which increases in response to an increase of the voltage of the alternating-current supply source 13, and vice versa, at such a rate that the voltage across secondary winding 16 and the voltage across the load remain substantially constant. The relationship between supply source voltage and the current through winding 18 may be adjusted by means of the variable resistor 39, a decrease of the resistance of resistor 39 increasing the rate of change of current in winding 18 with respect to the voltage of the supply source 13. Even if the impedance of winding 35 and the impedance of winding 36 were constant, an increase of line voltage would increase the rectified current through winding 18. However, the increased rectified currents flowing through windings 35 and 36, respectively, increase the unidirectional flux in the outer legs of the core to reduce the impedance of windings 35 and 36. As a result, the current increase in winding 18 in response to an increase of line voltage is greater than would be the case if alternating currents, rather than rectified pulsating currents, flowed through windings 35 and 36. Moreover, an increase of load voltage, for example, increases the current through winding 37 to reduce the impedance of windings 35 and 36. The current in winding 18 is thus increased to cause the voltage across secondary transformer winding 16 to decrease, thereby minimizing the increase of load voltage.

The voltage across the load 11 and battery 12 may be adjusted over an operating range by varying the variable resistor 46. Decreasing the resistance of resistor 46, for example, increases the current flowing through saturating winding 37 to increase the saturation of the core 34, thereby increasing the current supplied to transformer winding 18 and decreasing the load voltage. For each value of load voltage, there may be plotted a characteristic curve depicting the relationship between the voltage of the supply source 13 and the current through winding 18 of the transformer 14, a family of such curves thus showing this relationship for a plurality of values of load voltage. It was found experimentally that, when alternating current was supplied to windings 35 and 36 rather than pulsating current, the characteristic curves for different load voltage settings had different slopes, respectively, over the operating range so that the degree of compensation of the load voltage for line voltage changes was different for different load voltages, respectively. This difficulty was overcome by supplying unidirectional pulsating currents to the windings 35 and 36 of the saturable reactor 31 in the manner shown in the drawing. With the pulsating currents supplied to windings 35 and 36, the characteristic curves showing the relationship between the line voltage and the current through winding 18 for different load voltages, respectively, were substantially parallel over the operating ranges of line voltage, load voltage and load current.

Without the thermistor 45 in the circuit the load voltage would increase in response to an increase of ambient temperature, for example. This undesirable effect is reduced or substantially prevented by the thermistor 45. An increase of ambient temperature reduces the resistance of thermistor 45 to cause the current supplied to winding 37 of reactor 31 to increase, thereby increasing the current supplied to winding 18 of transformer 14 to cause the secondary voltage across winding 16 to decrease. The rise of load voltage due to the increase of ambient temperature is thus reduced or substantially prevented.

In some cases it may be desirable to design the circuit so that the magnetomotive force due to winding 37 opposes the magnetomotive forces due to windings 35 and 36. This change would result in relatively poorer load voltage regulation but the current limiting effect referred to above would be much sharper.

What is claimed is:

1. In combination, a saturable transformer comprising a first core of magnetic material, a primary, a secondary and a first and a second saturating winding, a saturable reactor comprising a second core of magnetic material and a third and a fourth winding, means having impedance for supplying alternating current from an alternating-current supply source to said primary, a main rectifier having input and output terminals, means for connecting said secondary to said input terminals, means for supplying rectified current from said output terminals through said first winding to a load circuit including a load, an auxiliary rectifier, means including said auxiliary rectifier for supplying rectified current from said supply source to said second and third windings in series, the currents supplied to said first and second windings setting up opposed unidirectional magnetomotive forces in said first core, and means connected across said load for supplying unidirectional current to said fourth winding.

2. A combination in accordance with claim 1 in which the currents supplied to said third and fourth windings respectively set up aiding unidirectional magnetomotive forces in said second core.

3. A combination in accordance with claim 1 in which said load circuit includes means for attenuating alternating components of the current supplied from said main rectifier to said load and in which means are provided for attenuating alternating components of the rectified current supplied to said second winding.

4. A combination in accordance with claim 1 in which said means for supplying unidirectional current to said fourth winding comprises a thermistor.

5. In combination, a saturable transformer comprising a first three-legged core of magnetic material, a primary winding on one of the outer legs of the core, a secondary winding on the other outer leg and a first and a second winding on the middle leg of the core, a saturable reactor comprising a second three-legged core of magnetic material, a third and a fourth winding on the outer legs respectively of said second core and a fifth winding on the middle leg of said second core, a second inductive reactor, means for supplying alternating current from an alternating-current supply source through said second reactor to said primary winding, a main rectifier having input and output terminals, means for connecting said input terminals to said secondary winding, means for supplying unidirectional current from the output terminals of said main rectifier through said first winding to a load circuit including a load, auxiliary rectifying means, a third inductive reactor, a condenser, means comprising said auxiliary rectifying means for supplying rectified current from said supply source through said third winding and said third reactor to said condenser to charge it with a predetermined polarity during half-cycle periods of one polarity of said supply source, means comprising said auxiliary rectifying means for supplying rectified current from said supply source through said fourth winding and said third reactor to said condenser to charge it with said predetermined polarity during half-cycle periods of the other polarity of said supply source, means for connecting said second winding across said condenser to cause rectified current to be supplied to said second winding, thereby causing said second winding to set up in said first core a unidirectional magnetomotive force which opposes the unidirectional magnetomotive force set up in said first core in response to the current supplied to said first winding, a temperature compensating thermistor, and a current path connected across said load comprising said thermistor and said fifth winding in series.

6. A combination in accordance with claim 5 in which there is provided a first variable resistor connected in series with said source and each of said third and fourth windings to control the unidirectional currents supplied to said third and fourth windings and the unidirectional current supplied to said second winding and in which there is provided a second variable resistor in said current path connected across said load to control the current supplied to said fifth winding.

7. A combination in accordance with claim 6 in which there is provided on the middle leg of said second core a sixth winding which is short-circuited.

8. The combination with means for rectifying current from an alternating-current supply source and for supplying the rectified current to a load, of means for controlling the supply of current to said load comprising a first saturable electromagnetic device having a first core of magnetic material and a first and a second winding on said core, a second saturable electromagnetic device comprising a second core of magnetic material having a third and a fourth winding thereon, means for supplying said load current through said first winding to said load, means for deriving and supplying unidirectional current from said supply source to said second and third windings in series and a current path comprising said fourth winding connected across said load, the currents supplied to said first and second windings respectively causing to be set up in said first core unidirectional magnetomotive forces which are opposed, the unidirectional current flowing through said third winding being a pulsating current and the currents supplied to said first, second and fourth windings respectively being relatively steady unidirectional currents.

References Cited in the file of this patent

UNITED STATES PATENTS

| | | |
|---|---|---|
| 2,036,708 | Logan | Apr. 7, 1936 |
| 2,052,978 | Jester | Sept. 1, 1936 |
| 2,114,827 | Aggers | Apr. 19, 1938 |
| 2,179,299 | Mureck | Nov. 7, 1939 |
| 2,306,998 | Claesson | Dec. 29, 1942 |
| 2,509,380 | Walker | May 30, 1950 |
| 2,560,294 | Grandstaft | July 10, 1951 |
| 2,561,329 | Ahlen | July 24, 1951 |
| 2,600,639 | Grandstaft | June 17, 1952 |
| 2,617,973 | Wolf, et al. | Nov. 11, 1952 |
| 2,707,262 | Walker | Apr. 26, 1955 |